United States Patent [19]

Pola

[11] 4,083,532
[45] Apr. 11, 1978

[54] ELECTRICAL WIRE ATTACHMENT

[76] Inventor: Carlo A. Pola, 129 Tupper Rd., Sandwich, Mass. 02563

[21] Appl. No.: 805,859

[22] Filed: Jun. 13, 1977

[51] Int. Cl.² .......................................... E21C 29/16
[52] U.S. Cl. ...................... 254/134.3 FT; 254/134.7
[58] Field of Search .................. 254/134.3 FT, 134.7

[56] References Cited

U.S. PATENT DOCUMENTS 1,658,887  2/1928  Dotzauer .......................... 254/134.7

Primary Examiner—Robert C. Watson
Attorney, Agent, or Firm—Norman S. Blodgett; Gerry A. Blodgett

[57] ABSTRACT

Electrician's tool, including an elongated body attachable at one end to a first fish wire and having wire loops at the other end engageable by a hook formed on a second fish wire.

8 Claims, 4 Drawing Figures

ELECTRICAL WIRE ATTACHMENT

BACKGROUND OF THE INVENTION

In the installation of electrical systems, it is common practice to run the metal conduit and then thread the electrical cable through the finished conduit network. Access to the network is provided at various parts of the system, but there are portions of the system which, because of the various bends, is difficult to thread the cable through, even when using fish wire. One stratagem that has been used in the past is to introduce a fish wire from each end of the difficult portion (each wire having a hook) and then to hook the two lengths of the fish wire together, so that one of them can be drawn through the conduit. Once one fish wire has been drawn through the section of conduit, then, of course, the cable is attached to one end and is pulled through the conduit by the fish wire. Unfortunately, it takes considerable manuvering of the two fish wires and a little bit of luck to cause the two hooks to engage. For that reason, it has been suggested that one of the hooks be replaced with a mass of wire similar to a mesh dishwashing pad. This arrangement suffers from a number of disabilities, not the least of which is the fact that it tends to come apart when subjected to the pulling action and it is also apt to release from its fish wire and result in an obstacle in the conduit system. These and other difficulties have been obviated in a novel manner by the present invention.

It is, therefore, an outstanding object of the invention to provide an electrician's tool which is relatively easy to thread through a conduit system of considerable length with many bends.

Another object of this invention is the provision of an electrical tool for use with fish wire that can be readily removed from the fish wire when not in use.

A further object of the present invention is the provision of an electrical installation tool which can resist substantial pulling force and which is not likely to disintergrate and leave an obstacle in a conduit system.

It is another object of the invention to provide an electrician's tool which is simple in construction, inexpensive to manufacture, and which is capable of a long life of useful service with a minimum of maintenance.

A still further object of the invention is the provision of an attachment for electrician's fish wire to facilitate the hooking together of two fish wires presented from opposite ends of a conduit system.

It is a further object of the invention to provide a head for use with electrician's fish wire which can be manuvered through bends in a conduit system without jamming.

It is a still further object of the present invention to provide a hooking head for fish wire which readily adapts itself to different sizes of conduits.

With these and other objects in view, as will be apparent to those skilled in the art, the invention resides in the combination of parts set forth in the specification and covered by the claims appended hereto.

SUMMARY OF THE INVENTION

In general, the invention consists of an electrical installation tool having a first fish wire, having a second fish wire formed with a hook on its end, and having an elongated body attached at one end to the first fish wire. A plurality of relatively flexible wire loops extend from the other end of the elongated body, each loop having two ends that are firmly locked in a longitudinal bore formed in the said other end of the body.

More specifically, the ends of the loops in the bore are surrounded and locked in place by solder. A set screw extends transversely into the body and into the bore for locking engagement with the first fish wire. The end of the body adjacent the loops is provided with a conical surface. A radial relief bore extends transversely through the body at the opposite side of the bore from and in alignment with the set screw. The loops are formed of a fine, malleable wire that can be extensively and repeatedly deformed without breakage.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
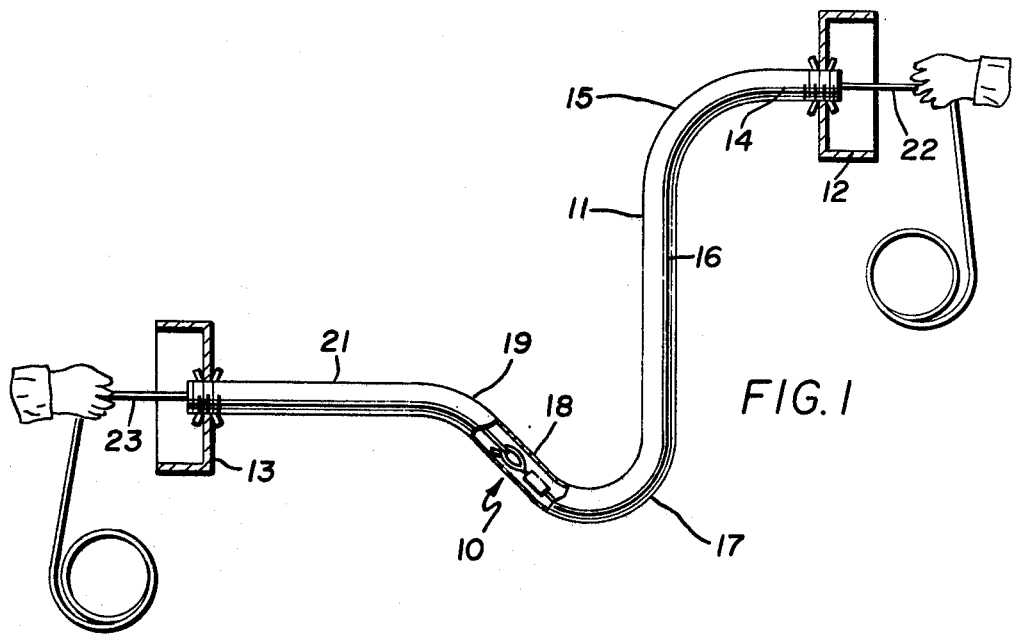
FIG. 1 is a perspective view showing the electrical installation tool of the invention in use with a conduit system.

Referring first to FIG. 1, wherein are best shown the general features of the invention, the electrical installation tool, indicated generally by the reference numeral 10, is shown in use with a conduit system 11. The conduit system consists of a junction box 12 and a junction box 13 located at opposite ends of a conduit string, including a straight conduit 14 directly attached to the junction box 12 and bend 15, a straight conduit 16, a bend 17, a straight conduit 18, a bend 19, and a straight conduit 21 connected to the junction box 13. In order to illustrate the invention, the conduit system is shown as having several bends in various planes. The tool 10 consists of a first fish wire 22 which is shown as being introduced into one end of the conduit system at the junction box 12 and a second fish wire 23 which is shown as being introduced into the other end of the conduit system through the junction box 13.

Figure 2:
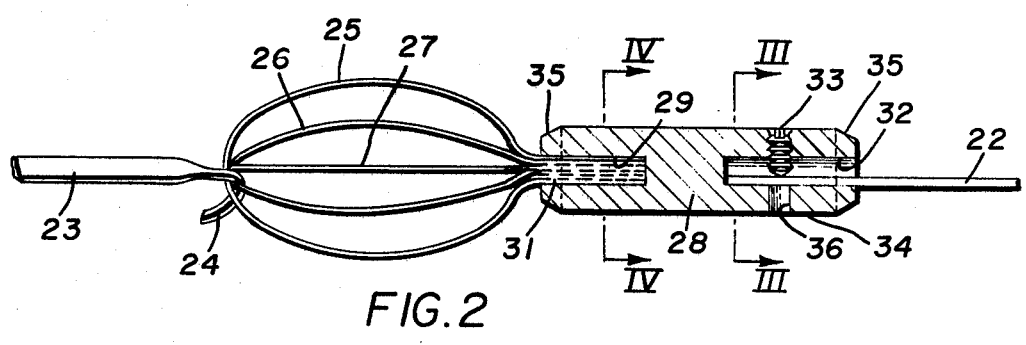
FIG. 2 is an enlarged elevational view of the tool.

FIG. 2 shows the manner in which the fish wires 22 and 23 meet in the center of the conduit system. The second fish wire 23 is provided with a hook 24. The first fish wire 22 is connected to one end of an elongated body 28 to the other end of which are attached a plurality of relatively flexible wire loops 25, 26, and 27. Each of these loops has two ends that are firmly held in a longitudinal axial bore 29 formed in the said other end of the body 28. The ends of the loops 25, 26, and 27 lie in the bore 29 and are surrounded and locked in place by a body 31 of solder.

The end of the body 28 which is attached to the first fish wire 22 is provided with a longitudinal bore 32 in which the first fish wire 22 lies. A slotted-head set screw 33 extends laterally into the body 28 and into the bore 32 for locking engagement with the first fish wire. The said screw 33 is selected of such a length that its head lies below the outer cylindrical surface 34 of the body 28 when it clamps the fish wire in place. The other end of the set screw is suitable pointed to make a firm engagement with the fish wire which, in the preferred embodiment, is of the type having a rectangular cross-sectional shape.

As has been stated above, the body 28 is provided with a cylindrical outer surface 34 and the two bores 29 and 32 extend axially thereof, of course, from opposite ends. The end of the body from which the loops 25, 26, and 27 extend is provided with a conical surface 35 and the other end is similarly chamfered. The length of the body 28 is selected such that it can pass freely around the sharpest corner encountered in the conventional electrical conduit system. A radial relief bore 36 extends transversely through the body 28 at the opposite side of the bore 32 and in alignment with the set screw 33. This relief bore serves the purpose of allowing dirt and and the like to be relieved from the bore 32 and also to allow a more firm connection between the set screw 33 and the fish wire 22. In the preferred embodiment, the loops 25, 26, and 27 are formed of a fine malleable wire that can be extensively and repeatedly deformed without breakage.

Figure 3:
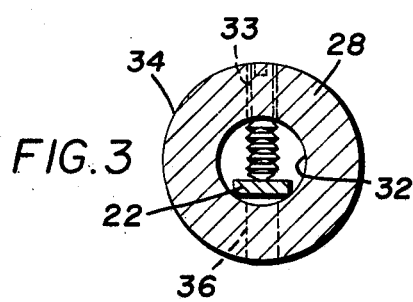
FIG. 3 is a sectional view of the tool taken on the line III—III of FIG. 2.
Figure 4:
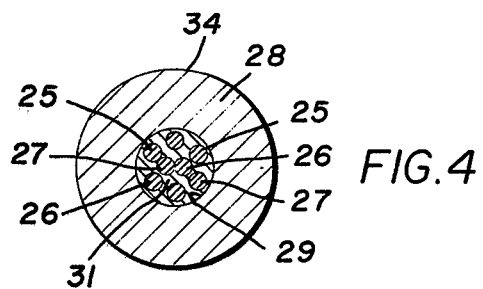
FIG. 4 is a sectional view of the invention taken on the line IV—IV of FIG. 2.

FIGS. 3 and 4 show certain details of the invention rather clearly. For instance, FIG. 3 illustrates the manner in which the set screw 33 serves to deform the fish wire 22, not only because of the curvature of the bore 32, but also because of the presence of the relief bore 36. FIG. 4 shows the manner in which the ends of the loops 25, 26, and 27 are squeezed into the bore 29 and are locked in place by the body 31 of solder.

The operation and advantages of the invention will now be readily understood in view of the above description. In operation, the first fish wire 22 carrying the body 28 and the loops is inserted into one end of the conduit system through the junction box 12 and the conduit 14. By pushing on the fish wire, it is possible to pass the loops around the bend 15, the conduit 16, the bend 17 into a straight portion 18 of the conduit. At the same time, another electrician inserts the second fish wire 23 with its hook 24 into the other end of the conduit system through the junction box 13 and the conduit 21. The wire 23 passes readily around the bend 19 into the conduit 18 and eventually approaches the loops extending from the body 28. The fish wire 23 is maneuvered further down the conduit past the loops and then is pulled back in the opposite direction. The probability of it engaging at least one of the loops is very high. Once hooking engagement is made, it is possible, by pulling on one fish wire or the other, to pull one of the fish wires completely through the conduit system 11. For instance, once the connection between the two fish wires 22 and 23 is made, the fish wire 22 can be pulled back in the reverse direction dragging the second fish wire 23 entirely through the conduit system. Then the electrical cable is tied to the hook 24 and is pulled back through the conduit system by reversing the direction of the second fish wire 23. As the loops 25, 26, and 27 pass through the conduits, they are compressed laterally, the amount of compression depending on the diameter of the conduit through which they pass. By selecting the malleability and stiffness of the loops, it is possible to accomplish the benefits of the present invention, irrespective of the size of the conduit, assuming that the body 28 can be maneuvered through restricted areas such as bends. Furthermore, when not in use, the body 28 and its loops 25, 26, and 27 can be removed from the fish wire 22 and stored. The use of the conical surface 35 at the leading end of the body 28 allows it to pass sharp edges in the conduit system without difficulty.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Electrical installation tool, comprising:
    a. a first fish wire,
    b. a second fish wire formed on one end with a hook,
    c. an elongated body one end of which is provided with a longitudinal bore for reception of the free end of said first fish wire and having relatively flexible wire loops extending from the other end, each loop having two ends that are firmly locked in a longitudinal bore formed in the said other end of the body, and
    d. means for locking said first fish wire within said longitudinal bore.

2. Electrical installation tool as recited in claim 1, wherein the ends of the loops in the bore are surrounded and locked in place by solder.

3. Electrical installation tool as recited in claim 2, wherein said locking means comprises a set screw which extends laterally into the body and into the bore for locking engagement with said first fish wire.

4. Electrical installation tool as recited in claim 3, wherein the set screw extends radially of the body, and wherein a radial relief bore extends through the body at the opposite side of the bore and in alignment with the set screw.

5. Electrical installation tool as recited in claim 3, wherein the body is formed with a cylindrical outer surface and the two bores extend axially thereof.

6. Electrical installation tool as recited in claim 5, wherein the said other end of the body is provided with a conical surface.

7. Electrical installation tool as recited in claim 1, wherein the length of the body is such that it can pass freely around the sharpest corner encountered in an electrical conduit system.

8. Electrical installation tool as recited in claim 1, wherein the loops are formed of a fine malleable wire that can be extensively deformed without breakage.

* * * * *